United States Patent

[11] 3,594,540

| [72] | Inventor | Edward J. Weinfurt<br>c/o The Pandjiris Weldment Co., 5151 Northrup Ave., St. Louis, Mo. 63110 |
|---|---|---|
| [21] | Appl. No. | 839,392 |
| [22] | Filed | July 7, 1969 |
| [45] | Patented | July 20, 1971 |

[54] TRACKING TRANSDUCER FOR WELDING APPARATUS
9 Claims, 12 Drawing Figs.

[52] U.S. Cl. .................................................. 219/125
 PL, 228/9, 338/44
[51] Int. Cl. .................................................. B23k 9/12
[50] Field of Search .................................................. 219/124
 PL, 125 PL, 126; 338/44, 46, 47; 228/45, 8, 9

[56] References Cited
UNITED STATES PATENTS

| 2,068,166 | 1/1937 | Dodge | 219/125 |
| 2,830,159 | 4/1958 | Varner | 338/44 X |
| 3,114,209 | 12/1963 | Foody et al. | 338/44 X |
| 3,171,012 | 2/1965 | Morehead | 219/124 |
| 3,271,650 | 9/1966 | Riddle | 338/44 X |
| 3,281,047 | 10/1966 | Weicht | 219/125 X |
| 3,408,475 | 10/1968 | Fier | 219/125 |

*Primary Examiner*—J. V. Truhe
*Assistant Examiner*—L. A. Schutzman
*Attorney*—Cohn and Powell

ABSTRACT: A tracking transducer for welding apparatus having a sensing means carried by a welding head, the sensing means including a follower that engages the workpieces to be joined together and follows the edge contour, means that oscillatively mounts a follower housing so that the angle of the follower can be varied transversely of the edge, and a variable resistor, responsive to angle of tilt, that is carried by and oscillatively movable with the follower housing as the follower engages the workpiece. Means operatively connect the variable resistor to a motor means for moving the welding head transversely of the edge in a direction to hold the head on the edge in response to any transverse deviation sensed by the follower and at a speed proportional to the deviation. The variable resistor is of a type that causes an increased voltage output proportional to the degree of angle tilt in either direction from a substantially null position. The relative angular position of the variable resistor and follower can be adjusted, whereby the resistor can be located in a substantially null position in any angular position of the follower.

PATENTED JUL 20 1971
3,594,540
SHEET 1 OF 3
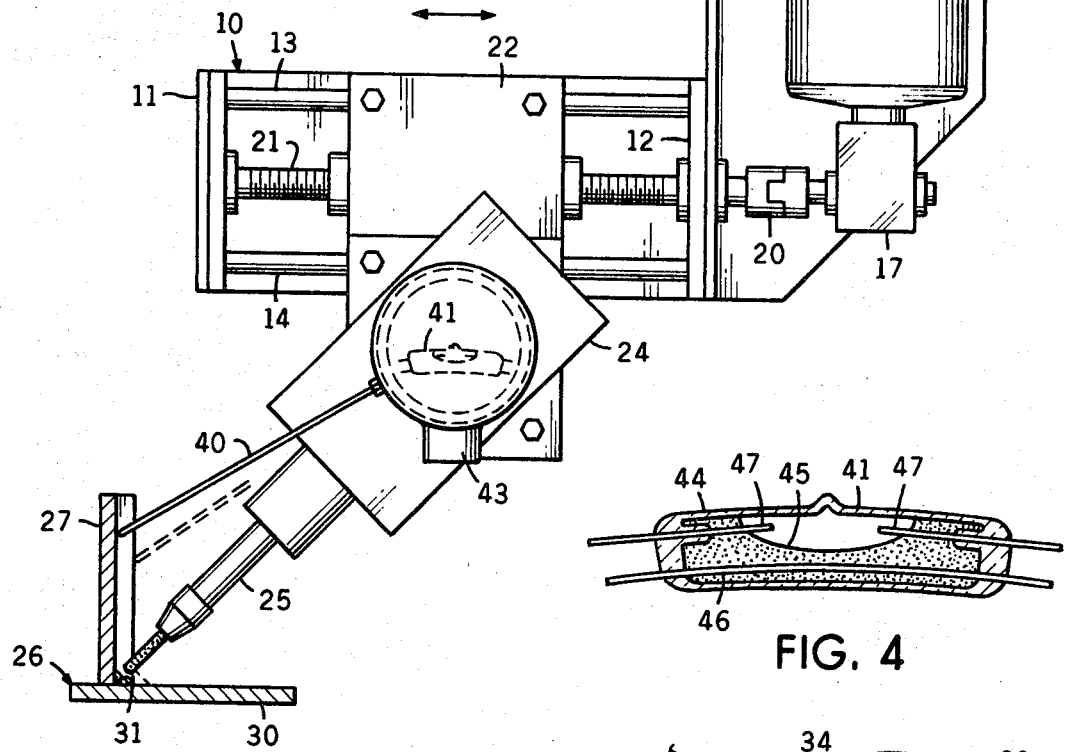
FIG. 1
FIG. 4
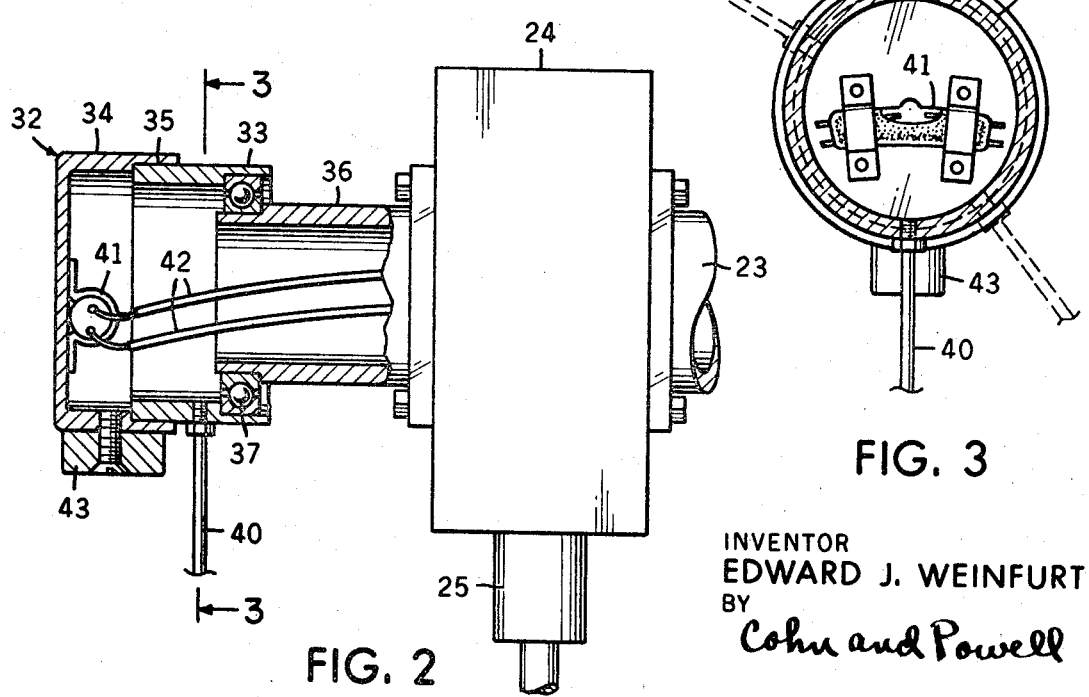
FIG. 2
FIG. 3
INVENTOR
EDWARD J. WEINFURT
BY
Cohn and Powell
ATTORNEYS

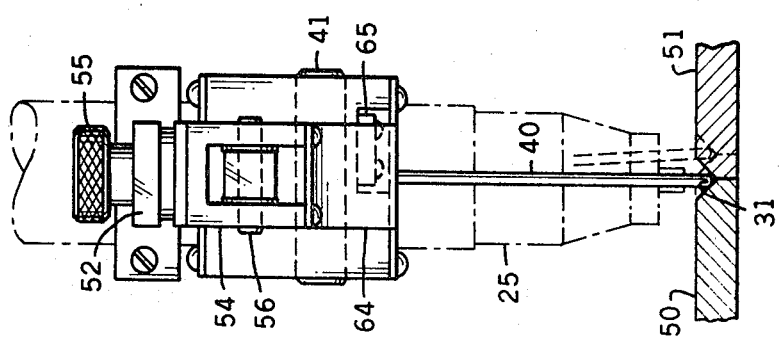
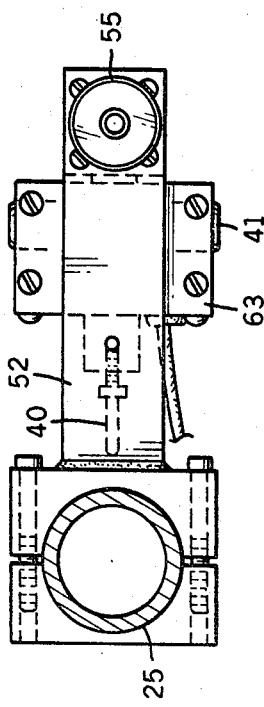
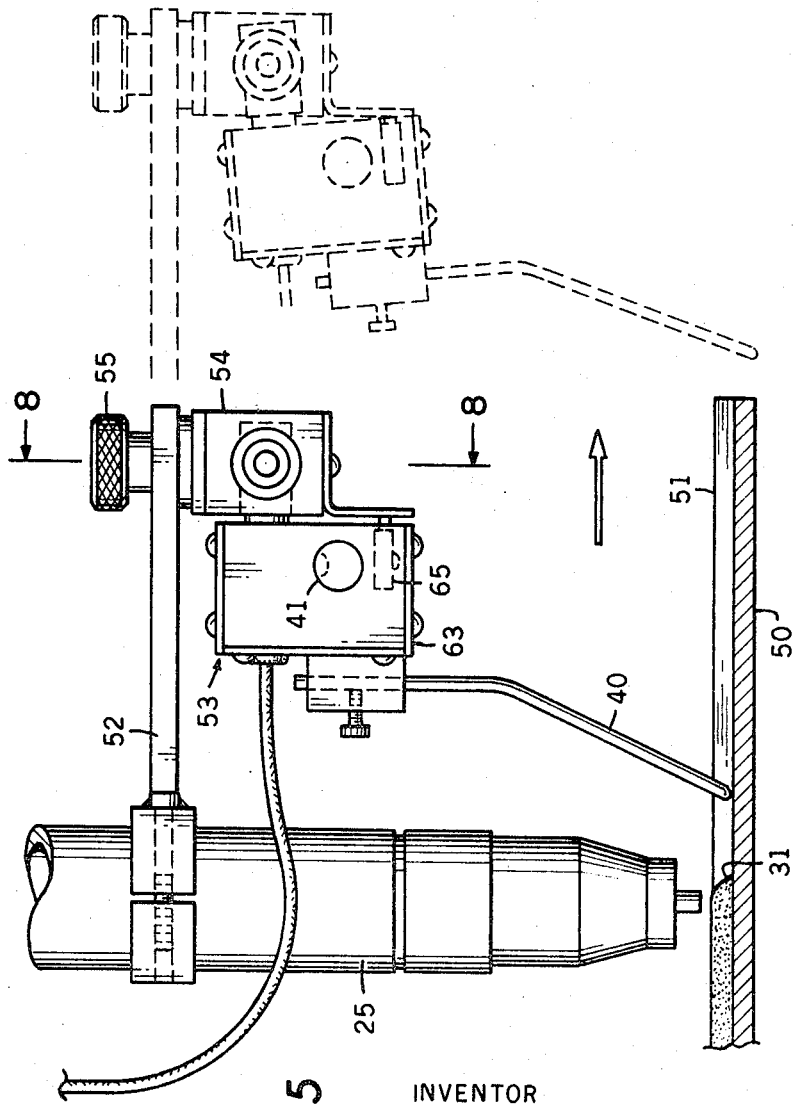

INVENTOR
EDWARD J. WEINFURT
BY
*Cohn and Powell*

ATTORNEYS

TRACKING TRANSDUCER FOR WELDING APPARATUS

BACKGROUND OF THE INVENTION

This invention relates generally to welding apparatus for forming a seam along an edge formed by the pieces to be joined together, and more particularly to an automatic tracking transducer for maintaining alignment of the welding head relative to the seam being formed.

In the heretofore conventional automatic groove followers for welding apparatus, the movement of the welding head was controlled primarily by one or more electrical make and break switches actuated by the follower. The resultant movement of the welding head was not sensitively controlled by such switches and as a consequence, there was a time lag between the sensing of any deviation by the follower and the corrective movement of the welding head. Moreover, the movement of the welding head was at a constant speed and had no relationship to the amount of deviation.

SUMMARY OF THE INVENTION

The present tracking transducer for welding apparatus incorporates an operative connection between the sensing follower and the welding head which enables a highly accurate and sensitive control in the movement of the welding head, such movement being fast and at a speed proportional to the amount of deviation sensed by the follower so that such deviation can be compensated for with little or no time lag.

The transducer includes a sensing means carried by the welding head, the sensing means having a follower that engages the workpieces and follows the edge contour, and a variable resistor, responsive to the angle of tilt, that is carried by and is oscillatively movable with the follower as the follower engages the workpieces. An electrically operated motor means adjustably positions the welding head transversely of the edge while the work and welding head move relatively incident to forming the seam. The variable resistor is operatively connected to the motor means so that the head is adjustably moved to be held on the edge in response to any transverse deviation sensed by the follower and the speed of correctional movement is proportional to the deviation.

The sensing means incorporates a means for adjusting the relative angular position of the variable resistor and the follower, whereby the follower can be located to follow the seam contour yet the resistor can be located in a null position.

The variable resistor utilized in the sensing means is of a type that causes an increased voltage output proportional to the degree of angle tilt in either direction from a substantially null position. The resistor is located and mounted to tilt transversely relative to the edge engaged by the follower and welding head.

In one embodiment, the mounting for the follower and resistor includes a housing having two parts interconnected to turn together as the follower angle changes. The follower is attached to one part and the variable resistor is carried by the other part. The connection between the housing parts enables relative angular adjustment so that the variable resistor can be located in a null position at any angular position of the follower.

In another embodiment, means is provided for oscillatively mounting the housing about a first pivot axis so that the variable resistor can tilt transversely relative to the edge engaged by the follower and welding head, such means also defining a second axis angularly related to the first axis. A switching means connected to the work and head moving means and carried by the housing is actuated when the housing moves to one limit about the second axis whereby to deenergize the work and head moving means. This deenergization is advantageous, for example, when the seam is completed and the follower operatively disengages from the work.

The second variable resistor, responsive to angle of tilt, can be utilized in the sensing means, the second resistor being carried by and oscillatively movable with the follower housing as the follower engages the workpiece, and being disposed generally in a direction of relative movement of the follower and edge. Means operatively connect the second variable resistor to the motor means for moving the welding head generally in a direction depthwise of the edge to hold the head on the edge in response to any depthwise deviation sensed by the follower and at a speed proportional to the deviation.

DESCRIPTION OF THE DRAWINGS

FIG. 1 is a front elevational view of a tracking transducer;

FIG. 2 is a fragmentary cross-sectional view through the sensing means illustrated in FIG. 1;

FIG. 3 is a cross-sectional view taken on line 3—3 of FIG. 2, the broken lines indicating other angular positions of the follower;

FIG. 4 is a cross-sectional view of the variable resistor;

FIG. 5 is a side elevational view of another embodiment of the tracking transducer;

FIG. 6 is a top plan view of the transducer shown in FIG. 5;

FIG. 7 is a front elevational view of the transducer as seen from the right of FIG. 5;

DESCRIPTION OF THE PREFERRED EMBODIMENTS

Figure 10:
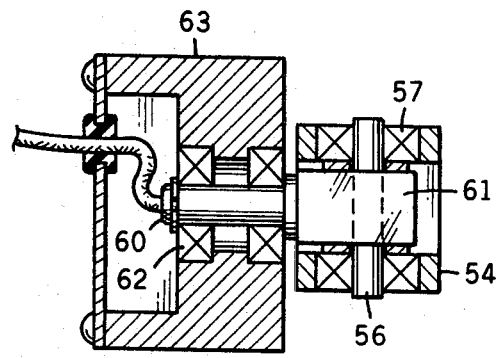
FIG. 10 is a cross-sectional view as taken on line 10—10 of FIG. 9.
Figure 8:
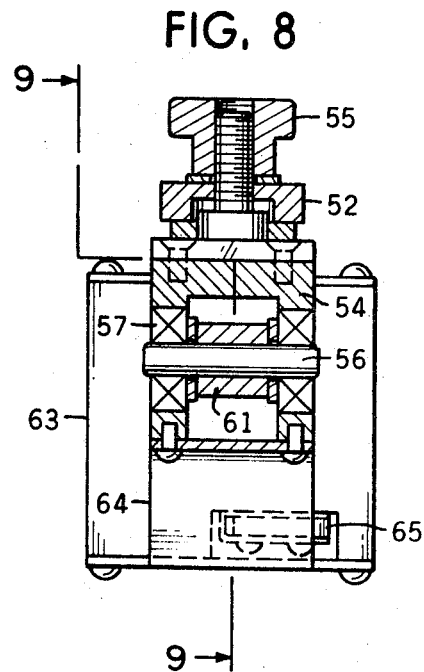
FIG. 8 is an enlarged, cross-sectional view of the sensing means as taken on line 8—8 of FIG. 5.

Referring now by characters of reference to the drawings, and first to the embodiment illustrated in FIGS. 1—3, the motor means includes a substantially horizontal slide structure generally indicated by 10 having end brackets 11 and 12. Mounted on and extending between the brackets 11 and 12 are a pair of bars 13 and 14, the bars 13 and 14 being disposed substantially horizontally in vertically spaced relation. A motor bracket 15 is attached to the end bracket 12. Carried on the bracket 15 is an electrically operated motor 16, the shaft of which is connected through a speed reducer 17 and coupling 20 to the end of a threaded shaft 21. The shaft 21 is rotatively mounted in bearings on the end brackets 11 and 12, and extends horizontally between the slide bars 13 and 14.

A crosshead 22 is slidably mounted on the slide bars 13 and 14 and is threadedly attached to the threaded shaft 21. Upon energization of motor 16, the threaded shaft 21 will be rotated in one direction or the other so as to move the crosshead 22 horizontally in one direction or the other along the slide structure 10.

As is best seen in FIG. 2, a tube 23 is attached to and extends from the face of crosshead 22. Bolted to and movable with the tube 23, is a welding head 24. A torch or welding electrode 25 constitutes a part of the welding head 24.

The work referred to by 26 in FIG. 1 consists of two pieces 27 and 30 to be joined together along an edge 31. Means is provided for relatively moving the work 26 and the welding head 24 while forming the seam along the edge 31.

A sensing means is provided to determine any deviation of the edge 31 from a predetermined path of relative travel of the welding head 24, and to compensate for such deviation and maintain the welding head on such edge. This sensing means includes a housing 32 consisting of two housing parts 33 and 34 connected in nested relation by a friction fit between overlapping connection 35. The first housing part 33 is rotatively mounted on tube 36 by ball bearing 37, the tube 36 being attached to the front face of the welding head 24. A follower 40 is fixed to the first housing part 33 and extends radially outward in a direction transversely of the welding edge 31. The follower 40 is adapted to engage the welding edge 31 or some portion of the workpiece or other guide means that simulates the contour of the edge 31.

Mounted in and on the second housing part 34 is a variable resistor 41. This variable resistor 41 is responsive to angle of tilt and is oscillatively movable with the housing 32 as the follower 40 engages the workpiece. The variable resistor 41 is of a type that causes an increased voltage output proportional to the degree of angle tilt in either direction from a null position, which, in the embodiment shown, is substantially horizontal. The resistor 41 is located to tilt transversely relative to the edge 31 engaged by the follower 40 and the welding head 24. Wires 42 are electrically connected to the resistor 41 and are connected through a suitable electrical circuit to the motor 16. When the follower 40 senses any transverse deviation, the follower 40 and the variable resistor 41 will tilt and thereby cause energization of motor 16 in the appropriate direction so as to move the crosshead 22 and hence move the welding head 24 slidably in a correspondingly appropriate transverse direction to hold the welding head 24 operatively on the edge 31, the movement of the welding head 24 being accomplished at a speed proportional to the amount of deviation.

The housing part 33 can be angularly adjusted relative to the housing part 34 through the friction connection 35 so that the resistor 41 can be located in a null position in any angular position of the follower 40. It will be understood that the follower 40 may have to be angularly adjusted depending on the type of workpiece being welded so that the follower 40 can engage a suitable guide surface. A counterweight 43 is fixed to the housing 32 so that the housing 32 tends to rotate in a direction to hold the variable resistor 41 in the null position.

The type of variable resistor 41 is best shown in FIG. 4. The resistor 41 consists of a closed tube 44 partially filled with electrolytic fluid that fully covers one contact 46 and at least partially covers the pair of upper, spaced contacts 47. Depending upon the direction of tilt, the electrolytic fluid 45 will expose or cover to a greater or lesser degree one of the exposed contacts 47 and thereby remove from or place more impedance into the circuit which causes the energization of motor 16 in the appropriate direction and at a speed proportional to the amount of tilt.

To utilize this apparatus, the welding electrode 25 is located on the edge 31 on which the seam is to be formed, and the housing part 34 is rotatively adjusted so that the follower 40 engages the workpiece 27 or other guide surface that simulates the contour of edge 31, while the variable resistor 41 is disposed in its null position. Preferably, the crosshead 22 is located initially midway of the slide structure 10. Then, relative movement of the work 26 and the welding head 24 is caused so that the welding electrode 25 moves along the edge 31 and forms the seam. The follower 40, engaging the workpiece 27, will sense any deviation from a predetermined path of relative electrode travel, and will tilt the housing 32, and hence tilt the variable resistor 41, thereby causing energization of the motor 16 in a direction to rotate the threaded shaft 21 and move the crosshead 22 in the appropriate transverse direction to maintain the welding head 24 on the edge 31. As explained previously, the movement of the welding head 24 is made at a speed proportional to the amount of deviation sensed by follower 40.

Another closely related embodiment is disclosed in FIGS. 5 through 12. Referring first to FIG. 5, it will be understood that the welded torch or electrode 25 is located on an edge 31 formed between workpieces 50 and 51, the welding electrode 25 being adapted to deposit and form a seam along the edge 31 to operatively interconnect such workpieces. The welding electrode 25 forms a part of a welding head that can be similar to that head 24 shown in the embodiments of FIGS. 1 through 3, and similar motor and crosshead means can be utilized for moving the welding electrode 25 transversely of the edge 31 to compensate for any deviation.

The sensing means in this embodiment includes a bracket 52 fixed to and carried by the welding electrode 25, the bracket 52 extending outwardly and forwardly generally in a direction longitudinally of edge 31. A housing referred to by 53 is carried by the end of bracket 52. The detailed construction of housing 53 is perhaps best illustrated in FIGS. 8 through 12.

The housing 53 includes a first housing part 54 that is fixed to the underside of bracket 52 by a threaded bolt and nut connection 55. Located in the housing part 54 is a pivot pin 56, constituting a first pivot axis, mounted on bearing 57 and generally disposed horizontally and in a direction transversely of the edge 31. A second pivot pin 60 is rotatively mounted on the first pivot pin 56 by a collar 61. The second pivot pin 60 extends generally in a direction longitudinally of the edge 31. Rotatively mounted on the second pivot pin 60 by bearings 62 is a second housing part 63. The follower 40 is attached to and carried by the second housing part 63, and is arranged to engage the work edge 31. The variable resistor 41 is carried within the second housing 63 and is arranged transversely to the pivot axis defined by pin 60 and transversely to longitudinal edge 31.

When the follower 40 senses a transverse deviation along the longitudinal length of edge 31 upon relative movement of welding electrode 25 and the edge 31, the follower 40 will cause the second housing part 63, and hence the variable resistor 41, to turn about the pivot axis defined by the pin 60. The variable resistor 41 is connected by conductors 42 to a suitable electrical circuit that is attached to the electric motor 16 of the motor and crosshead means whereby the welding head including the electrode 25 is moved transversely of the edge 31 in a direction to hold the head on the edge 31 in response to such transverse deviation sensed by the follower 40. Of course, the variable resistor 41 operates in the same way as previously described with the embodiment of FIGS. 1—3, and causes the welding head to move at a speed proportional to the deviation.

An angle bracket 64 is attached to the underside of the first housing part 54 and forms a stop that limits the downward movement of the second housing part 63 about the pivot axis defined by pin 56. Attached to the second housing part 63 is a microswitch 65 that is operatively connected in the circuit with the head and work moving means. The actuating arm 66 of switch 65 engages the angle bracket 64 when the second housing part 63 rotates counterclockwise (FIG. 9) to its lowermost position about the pivot pin 56, and thereby actuates the switch 65 to deenergize the head and work moving means. This switch 65 is especially advantageous when the follower 40 will leave or drop off the workpiece edge 31 upon completion of the welding seam.

In the operation of this embodiment, the bracket 52 is located so that the follower 40 engages the work edge 31 just ahead of the electrode 25, and the height of the bracket 52 is adjusted so that the microswitch 65 is not actuated by engagement of the switch arm 66 with the bracket 64. Upon relative movement of the work 50—51 and the electrode 25, the follower 40 will move along the edge 31, sensing the contour. Upon transverse deviation of the edge 31 from a predetermined longitudinal path, the variable resistor 41 will tilt in one direction or the other depending upon the direction of deviation. As explained previously, the variable resistor 41 will cause the motor 16 to be energized and thereby cause the welding head to move in one direction or the other transversely of the edge 31 whereby to hold the electrode 25 on the edge 31, the movement of the welding head and electrode 25 being at a speed proportional to the deviation. If the follower 40 moves off the edge 31, as would happen upon completion of the welding seam, the second housing part 63 will fall and rotate about the pivot axis defined by pin 56 and thereby cause operative engagement of the switch arm 66 with the stop bracket 64. The microswitch will then cease relative movement of the welding head and workpieces.

Figure 9:
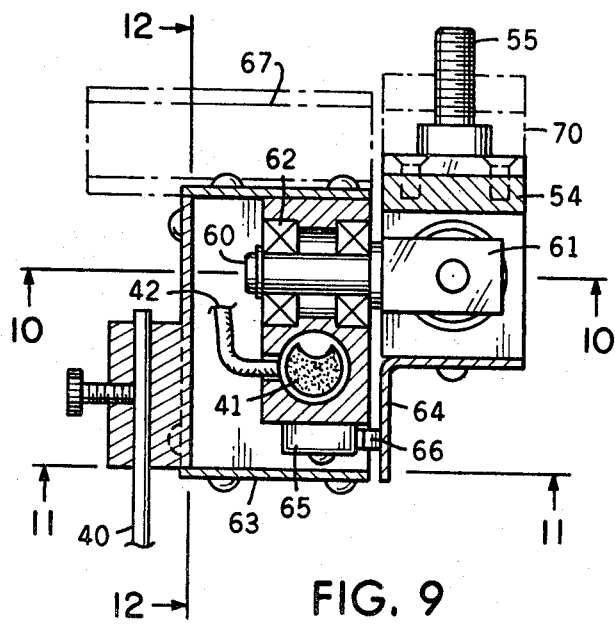
FIG. 9 is a cross-sectional view as taken on staggered line 9—9 of FIG. 8.
Figure 11:
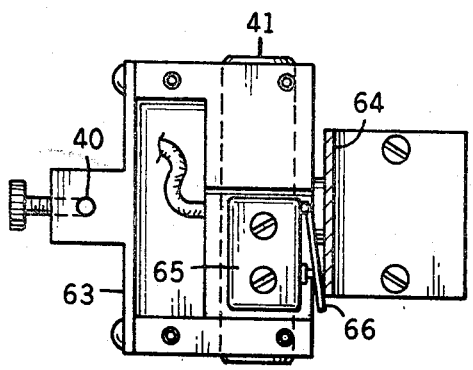
FIG. 11 is a bottom plan view, partially in cross section, as taken on line 11—11 of FIG. 9.
Figure 12:
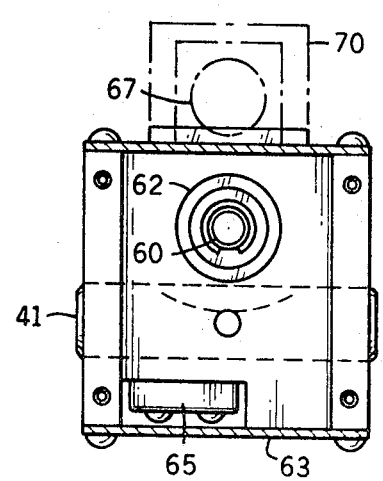
FIG. 12 is a front elevational view, partly in cross section as taken on line 12—12 of FIG. 9.

As is indicated in FIGS. 9 and 12, a second variable resistor 67, shown in phantom lines, can be attached to the second housing part 63. This second resistor 67 is of the same type as the variable resistor 41 and is located generally in the direction of relative movement of the follower 40 and the edge 31. As will be understood, means is provided for operatively connecting the second variable resistor 67 to the motor 16 when used with a compound slide structure for moving the welding head generally in a direction depthwise the edge 31 to hold the head on the edge 31 in response to any depthwise deviation sensed by the follower 40 and at a speed proportional to the deviation. FIG. 9 illustrates a modification of the connection 70 of first housing part 54 to the bracket 52 to provide clearance between the second resistor 67 and the bracket 52 so that the second housing part 63 can tilt sufficiently about the second axis defined by pin 56 without obstruction.

I claim as my invention:

1. In an apparatus for welding work having at least one edge formed by the pieces to be joined together:
   a. a welding head for forming a seam along the edge,
   b. means for relatively moving the work and welding head while forming the seam,
   c. electrically operated motor means for adjusting the position of the welding head transversely of the edge,
   d. sensing means carried by the welding head, the sensing means including:
      1. a follower engaging the workpieces and following the edge contour,
      2. a housing attached to the follower,
      3. means oscillatively mounting the housing so that the housing and follower oscillate together about a common axis and so that the angle of the follower can be varied transversely of the edge, and
      4. a variable resistor responsive to angle of tilt, carried by and oscillatively movable with the follower housing about the said common axis as the follower engages the workpieces, and
   e. means operatively connecting the variable resistor to the motor means for moving the welding head transversely of the edge in a direction to hold the welding head on the edge in response to any transverse deviation sensed by the follower and at a speed proportional to the deviation 2. An apparatus as defined in claim 1, in which:
   f. the housing includes two parts interconnected to turn together about the said common axis as the follower angle changes, the follower being attached to one part and the variable resistor being carried by the other part, the connection between the housing parts enabling relative angular adjustment of the housing parts about the said common axis so that the variable resistor can be located in a substantially null position in any angular position of the follower.

3. An apparatus as defined in claim 1, in which:
   f. means provided on the follower and the resistor housing which tends to maintain the resistor in a substantially null position.

4. An apparatus as defined in claim 1, in which:
   f. means is provided for adjusting the relative angular position of the variable resistor and follower about the said common axis.

5. An apparatus as defined in claim 1, in which:
   f. the housing includes two parts interconnected to turn together about the said common axis as the follower angle changes, the follower being attached to one part and the variable resistor being carried by the other part, the connection between the housing parts enabling relative angular adjustment of the housing parts about the said common axis so that the variable resistor can be located in a substantially null position in any angular position of the follower, and
   g. means provided on the follower and resistor housing which tends to maintain the resistor in a substantially null position.

6. An apparatus as defined in claim 1, in which:
   f. the variable resistor is of a type that causes an increased voltage output proportional to the degree of angle tilt in either direction from a substantially null position, and the variable resistor is located to tilt transversely relative to the edge engaged by the follower and welding head.

7. In an apparatus for welding work having at least one edge formed by the pieces to be joined together;
   a. a welding head for forming a seam along the edge,
   b. means for relatively moving the work and welding head while forming the seam,
   c. electrically operated motor means for adjusting the position of the welding head transversely of the edge,
   d. sensing means carried by the welding head, the sensing means including:
      1. a follower engaging the workpieces and following the edge contour,
      2. a housing attached to the follower,
      3. means oscillatively mounting the housing so that the angle of the follower can be varied transversely of the edge, and
      4. a variable resistor responsive to angle of tilt, carried by and oscillatively movable with the follower housing as the follower engages the workpieces, and
   e. means operatively connecting the variable resistor to the motor means for moving the welding head transversely of the edge in a direction to hold the welding head on the edge in response to any transverse deviation sensed by the follower and at a speed proportional to the deviation,
   f. the means oscillatively mounting the housing defines a first pivot axis so that the variable resistor can tilt transversely relative to the edge engaged by the follower and welding head, and defines a second axis angularly related to the first axis, and
   g. switching means connected to the means for relatively moving the work and head and carried by the housing, the switching means being actuated when the housing moves to one limit about the second axis whereby to deenergize the work and head moving means.

8. An apparatus as defined in claim 7, in which:
   h. the housing includes a first part that carries the follower and the variable resistor, and a second part that is fixed to the welding head,
   i. the mounting means defining the second axis is carried by the second housing part, the second axis being disposed substantially horizontally transversely of the edge engaged by the follower, and the first axis being disposed substantially at a right angle to the second axis and generally in the direction of relative movement of the follower and edge, and
   j. the first housing part is oscillatively mounted about both the first and second axes.

9. In an apparatus for welding work having at least one edge formed by the pieces to be joined together:
   a. a welding head for forming a seam along the edge,
   b. means for relatively moving the work and welding head while forming the seam,
   c. electrically operated motor means for adjusting the position of the welding head transversely of the edge,
   sensing means carried by the welding head, the sensing means including:
      1. a follower engaging the workpieces and following the edge contour,
      2. a housing attached to the follower,
      3. means oscillatively mounting the housing so that the angle of the follower can be varied transversely of the edge, and
      4. a variable resistor responsive to angle of tilt, carried by and oscillatively movable with the follower housing as the follower engages the workpieces, and
   e. means operatively connecting the variable resistor to the motor means for moving the welding head transversely of the edge in a direction to hold the welding head on the edge in response to any transverse deviation sensed by the follower and at a speed proportional to the deviation,
   f. a second variable resistor, responsive to angle of tilt, carried by and oscillatively movable with the follower housing as the follower engages the workpiece, the second resistor being disposed generally in the direction of the relative movement of the follower and edge, g. the means oscillatively mounting the housing defines a first axis so that the first resistor can tilt transversely relative to the edge engaged by the follower and welding head, and defines a second pivot axis angularly related to the first pivot axis about which the second resistor can tilt, and h. means operatively connects the second variable resistor to the motor means for moving the welding head generally in a direction depthwise of the edge to hold the head on the edge in response to any depthwise deviation sensed by the follower and a speed proportional to the deviation, and i. switching means connected to the means relatively moving the work and head and carried by the housing, the switching means being actuated when the housing moves to one limit about the second axis whereby to deenergize the work and head moving means.